United States Patent
Cumming et al.

(10) Patent No.: US 8,024,557 B2
(45) Date of Patent: *Sep. 20, 2011

(54) BOOTING AN INTEGRATED CIRCUIT

(75) Inventors: Peter Cumming, Wickwar (GB);
Stephen Felix, Bristol (GB)

(73) Assignee: Icera, Inc., Wilmington, DE (US)

( * ) Notice: Subject to any disclaimer, the term of this patent is extended or adjusted under 35 U.S.C. 154(b) by 606 days.

This patent is subject to a terminal disclaimer.

(21) Appl. No.: 12/127,131

(22) Filed: May 27, 2008

(65) Prior Publication Data
US 2009/0172383 A1    Jul. 2, 2009

Related U.S. Application Data

(63) Continuation-in-part of application No. 11/967,618, filed on Dec. 31, 2007, now abandoned.

(51) Int. Cl.
*G06F 9/00* (2006.01)
*G06F 9/24* (2006.01)
*G06F 15/177* (2006.01)

(52) U.S. Cl. .............................. 713/2; 713/1
(58) Field of Classification Search .................. 713/1, 2
See application file for complete search history.

(56) References Cited

U.S. PATENT DOCUMENTS

| | | | | |
|---|---|---|---|---|
| 5,961,641 A * | 10/1999 | Hasegawa et al. | | 713/1 |
| 5,999,952 A * | 12/1999 | Jenkins et al. | | 708/100 |
| 6,421,777 B1 * | 7/2002 | Pierre-Louis et al. | | 713/2 |
| 6,446,203 B1 * | 9/2002 | Aguilar et al. | | 713/2 |
| 6,583,982 B2 * | 6/2003 | Mancini et al. | | 361/679.03 |
| 6,668,318 B1 * | 12/2003 | Jenkins et al. | | 713/1 |
| 7,764,506 B2 * | 7/2010 | Sullivan | | 361/730 |
| 2003/0115444 A1 * | 6/2003 | Yang | | 713/2 |
| 2005/0223211 A1 * | 10/2005 | Sukegawa et al. | | 713/2 |
| 2005/0262334 A1 * | 11/2005 | Scudder | | 713/1 |
| 2005/0268085 A1 * | 12/2005 | Chen et al. | | 713/2 |
| 2009/0158024 A1 * | 6/2009 | Hung et al. | | 713/2 |
| 2009/0158025 A1 * | 6/2009 | Hung et al. | | 713/2 |
| 2009/0172380 A1 * | 7/2009 | Cumming | | 713/2 |
| 2009/0187754 A1 * | 7/2009 | Hwang | | 713/2 |
| 2010/0095104 A1 * | 4/2010 | Lewis et al. | | 713/2 |

* cited by examiner

*Primary Examiner* — Mark Connolly

(57) ABSTRACT

An integrated circuit comprising: a processor; a plurality of external pins operatively coupled to the processor; and a permanently written memory operatively coupled to the processor, the memory having a plurality of regions each storing one or more respective boot properties for booting the processor. The processor is programmed to select one of the regions in dependence on an indication received via one or more of the external pins, to retrieve the one or more respective boot properties from the selected region, and to boot using the one or more retrieved boot properties.

36 Claims, 2 Drawing Sheets

BOOTING AN INTEGRATED CIRCUIT

RELATED APPLICATIONS

This application is a continuation-in-part of related U.S. application Ser. No. 11/967,618, filed 31 Dec. 2007, the contents of which is incorporated herein in their entirety by reference.

FIELD OF THE INVENTION

The present invention relates to a configurable boot mechanism for an integrated circuit (IC).

BACKGROUND

Integrated circuits that include a microprocessor require a mechanism by they start up, or "Boot".

Since they include a programmable microprocessor, such ICs are flexible enough to be designed into a variety of products. However, different products may require the IC to behave in different ways. While the majority of these differences can be accommodated by making changes to software, a mechanism is still needed to load the necessary code into the IC at boot time. Unfortunately this very mechanism may also be application specific. For example, in some applications the boot code may be stored in one of several types of external non-volatile memory chip, while in others the IC may be expected to load its boot code using one of a variety of serial communications links.

It would be advantageous to provide a more flexible, configurable boot mechanism.

SUMMARY

One way to express which source to boot from would be use some external connections (pins) on the IC to indicate a boot option. However, used alone, this would have the disadvantage that the details of all possible boot options for all possible end-products would have to have been anticipated when the IC was manufactured. Any shortcoming in this regard could require manufacturing new versions of the IC, which is a very expensive proposition especially using today's small geometry CMOS logic processes.

There is also a second reason for not wanting to use pins to directly select the boot configuration. Such an approach might for example involve using pins to select specific characteristics—e.g. a 0 or 1 on a certain pin might select between booting from a UART or a NOR memory respectively. But the problem with this is that each feature needs a pin which soon ends up using many pins on the chip.

Another way would be to use on-chip, writable, non-volatile storage programmed to express the boot option. Such storage could for example consist of laser or electrically programmable fuses. However, used alone, each IC would then need to be customized for a particular end-user or application by programming the ICs appropriately. This would make on-the-shelf inventory less flexible since ICs that had been 'fused' in a particular way could be sold into only one application.

According to one aspect of the present invention, there is provided an integrated circuit comprising: a processor; a plurality of external pins operatively coupled to the processor; and a permanently written memory operatively coupled to the processor, the memory having a plurality of regions each storing one or more respective boot properties for booting said processor; wherein the processor is programmed to select one of said regions in dependence on an indication received via one or more of said external pins, to retrieve the one or more respective boot properties from the selected region, and to boot using the one or more retrieved boot properties.

According to a further aspect of the present invention, there is provided a method of booting an integrated circuit comprising a processor, the method comprising: inputting an indication of a boot option to one or more external pins of the integrated circuit; using said indication to identify one of a plurality of regions in a permanently written memory on the integrated circuit, each region storing one or more respective boot properties for booting the processor; retrieving the one or more respective boot properties from the identified region of said memory; and booting the processor using the one or more retrieved boot properties.

According to another aspect of the present invention, there is provided a system comprising: an integrated circuit comprising a processor, a plurality of external pins operatively coupled to the processor, and a writeable non-volatile memory operatively coupled to the processor, the memory having a plurality of regions each for storing one or more respective boot properties for booting the processor; and writing apparatus arranged to write one or more respective boot properties to at least one of said regions for use in booting the processor; programming apparatus arranged to program the processor to select one of said regions in dependence on an indication received via one or more of said external pins, to retrieve the one or more respective properties from the selected region, and to boot using the one or more retrieved boot properties.

According to another aspect of the present invention, there is provided method of configuring an integrated circuit for booting, the integrated circuit comprising a processor, a plurality of external pins, and a writeable non-volatile memory having a plurality of regions each for storing one or more respective boot properties, and the method comprising: writing one or more respective boot properties to at least one of said regions of said non-volatile memory for use in booting the integrated circuit; and programming the processor to select one of said regions in dependence on an indication received via one or more of said external pins, to retrieve the one or more respective properties from the selected region, and to boot using the one or more retrieved boot properties.

Thus the present invention uses one or more external pins to select between a plurality of configurable boot options. So different boot options can be selected for different applications by providing an indication at one or more boot configuration input pins of the IC. But as well, details of new boot options or changes to old options (perhaps unanticipated when the IC was first manufactured) can be programmed into the non-volatile memory, reducing the likelihood of requiring very time consuming and expensive modifications to the IC's design.

Further, this minimises the number of pins required to select a boot configuration, by using an index read from the pins to select one of a potentially much larger number of configurations.

In embodiments, the one or more boot properties in each region may comprise at least an identifier of a respective boot source; and the processor may be programmed to retrieve the respective identifier from the selected region, and to boot from the source of boot code identified by the retrieved identifier.

The integrated circuit may comprise a primary boot ROM storing primary boot code, each of said sources being a source of secondary boot code; and the processor may be configured to initiate booting by executing the primary boot code, the primary boot code containing code which when executed causes the processor to retrieve the identifier and continue the booting from the secondary boot code of said identified source.

Said memory may comprise at least one of: a bank of fuse latches and a ROM.

The identifier may be an identifier of one of: an external flash memory, a serial link, and a secondary on-chip ROM The integrated circuit may comprises a respective internal switchable resistor arrangement coupled between each of said one or more pins and a first voltage rail, configured to couple its respective pin to the first voltage rail if that pin is not externally coupled to a second voltage rail during booting, and to de-couple its respective pin from the first rail if that pin is externally coupled to the second voltage rail during booting.

Said one or more pins may be arranged to allow the debugger to control the boot when connected to those pins and said indication to control the boot when the debugger is not connected.

In one implementation, a user device may comprise the integrated circuit and an RF front-end, wherein said one or more pins may be connected to indicate a source for configuring the processor as a soft modem for communicating over a wireless cellular network via said RF front-end.

According to another aspect of the present invention, there is provided integrated circuit comprising: a processor; a plurality of external pins; a permanently written memory operatively coupled to the processor, the memory having a plurality of regions each storing one or more respective boot properties for booting said processor; circuitry operatively coupled to the processor, the memory and the pins, the circuitry being configured to select one of said regions in dependence on an indication received via one or more of said external pins, to retrieve the one or more respective boot properties from the selected region, and to boot the processor using the one or more retrieved boot properties.

According to another aspect of the present invention, there is provided an integrated circuit comprising: a plurality of external pins; a permanently written memory operatively coupled to the processor, the memory having a plurality of regions each storing one or more respective boot properties for booting the integrated circuit; circuitry operatively coupled to the pins, the circuitry being configured to select one of said regions in dependence on an indication received via one or more of said external pins, to retrieve the one or more respective boot properties from the selected region, and to boot the integrated circuit using the one or more retrieved boot properties.

According to another aspect of the present invention, there is provided integrated circuit comprising: processing means; external input means; permanent storage means having a plurality of regions each storing one or more respective boot properties for booting the processing means; selection means for selecting one of said regions in dependence on an indication received via said input means, retrieving the one or more respective boot properties from the selected region, and booting the processing means using the one or more retrieved boot properties.

According to another aspect of the present invention, there is provided a user terminal having an integrated circuit comprising: a processor; a plurality of external pins operatively coupled to the processor; and a permanently written memory operatively coupled to the processor, the memory having a plurality of regions each storing one or more respective boot properties for booting said processor; wherein the processor is programmed to select one of said regions in dependence on an indication received via one or more of said external pins, to retrieve the one or more respective boot properties from the selected region, and to boot using the one or more retrieved boot properties.

BRIEF DESCRIPTION OF THE DRAWING

For a better understanding of the present invention and to show how it may be carried into effect, reference will now be made by way of example to the accompanying drawing in which.

DETAILED DESCRIPTION

Figure 1:
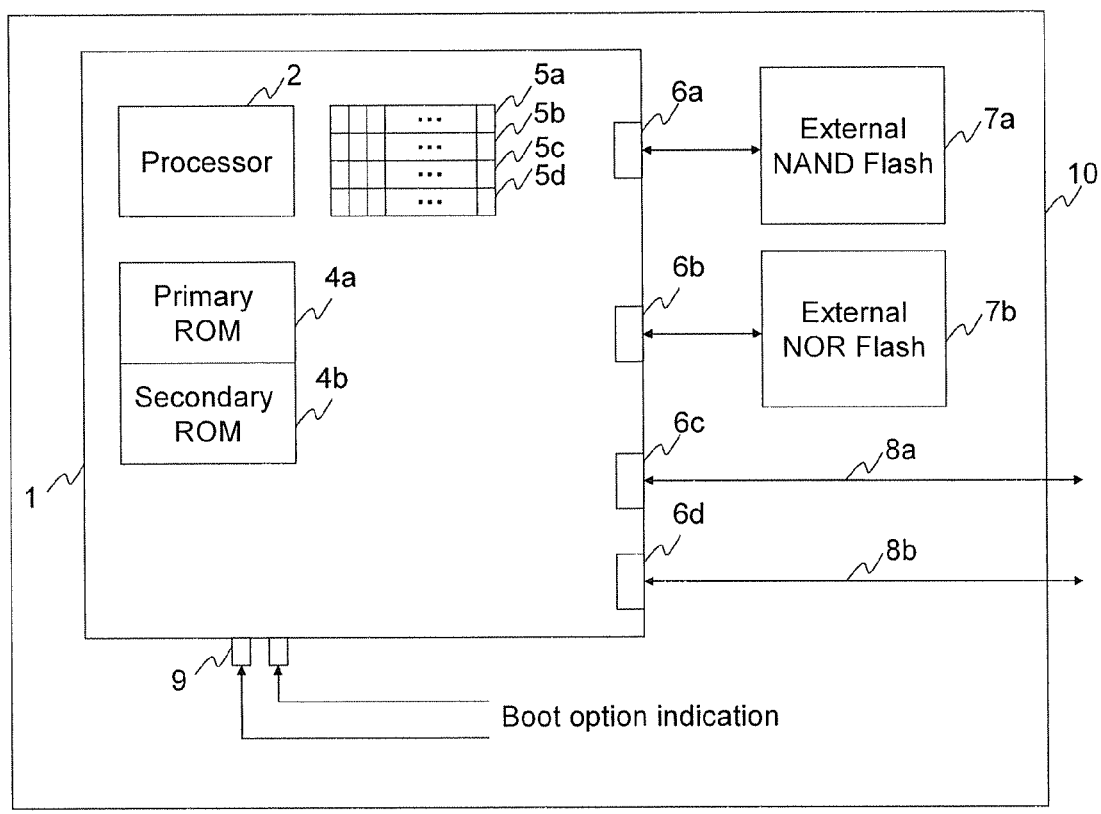
FIG. 1 is a schematic block diagram of a processor in a user device.

FIG. 1 shows schematically a user device 10, preferably a mobile terminal or other wireless device such as a mobile phone, laptop wireless data card, PDA, etc. In a preferred embodiment of the present invention, the device 10 comprises an integrated circuit 1 having a processor 2 configured as a software modem or "soft modem" for communicating over a wireless cellular network. The principle behind software modem is to perform a significant portion of the signal processing and associated functions required for the wireless communications in a generic, programmable, reconfigurable processor, rather than in dedicated hardware.

The integrated circuit 1 comprises an RF interface (not shown), and the device 10 comprises RF front-end hardware (also not shown) including at least an antenna. Preferably, the processor 2 is programmed as a soft baseband modem. That is, on the receive side, all the radio functionality from receiving RF (radio frequency) signals from the antenna up to and including mixing down to baseband is implemented in dedicated hardware. Similarly, on the transmit side, all the functionality from mixing up from baseband to outputting RF signals to the antenna is implemented in dedicated hardware. However, all functionality in the baseband domain is implemented in software stored in a memory and executed by the processor 1. While this is a preferred implementation, solutions where the RF/IF stage is not implemented by dedicated hardware are also envisaged.

In the preferred implementation, the dedicated hardware in the receive part of the front-end may comprise a low noise amplifier, (LNA), mixers for downconversion of the received RF signals to IF and for downconversion from IF to baseband, RF and IF filter stages, and an analogue to digital conversion (ADC) stage. An ADC is provided on each of in-phase and quadrature baseband branches for each of a plurality of receive diversity branches. The dedicated hardware in the transmit part of the front-end may comprise a digital to analogue conversion (DAC stage, mixers for upconversion of the baseband signals to IF and for upconversion from IF to RF, RF and IF filter stages, and a power amplifier (PA). Details of the required hardware for performing such basic radio functions will be known to a person skilled in the art.

The software may then handle functions such as:
Modulation and demodulation
Interleaving and deinterleaving
Rate matching and dematching
Channel estimation
Equalisation
Rake processing
Bit log-likelihood ratio (LLR) calculation Transmit diversity processing
Receive diversity processing
Multiple transmit and receive antenna (MIMO) processing
Voice codecs
Link adaptation through power control or adaptive modulation and coding
Cell measurements In a preferred embodiment, the chip used is manufactured by Icera and sold under the trade name Livanto®. Such a chip has a specialised processor platform described for example in WO2006/117562.

An advantage of a soft modem type system is that it can be programmed and potentially reprogrammed to handle different protocols, algorithms, functions, radio access technologies and the like. For example, conventionally different radio access technologies would require different dedicated hardware to be included on a phone or other wireless terminal, and a terminal adapted to handle multiple radio access technologies or "multimode" terminal would have to include different sets of dedicated hardware. This problem is solved by software modem techniques, in which the differences in communicating according to different radio access technologies are handled in software. The processor could be programmed to handle both 2G and 3G cellular standards, including for example perhaps one or more of the GSM, UMTS, EDGE, DigRF, High Speed Downlink Packet Access (HSDPA), and High Speed Uplink Packet Access (HSUPA), and 3GPP Long Term Evolution (LTE) standards.

Alternatively or additionally, the use of software modem techniques may allow a maker or designer of a user device 10, or a manufacturer or distributor of the chip 1, to take a batch of generic or "standard agnostic" processors and then program them according to different radio standards and technologies for different customers or purposes. A soft modem could also be updated easily and inexpensively by reprogramming it to handle new or different technologies.

Thus to fully exploit of the flexible nature of the soft modem, it can be seen that it would be useful to allow the processor 2 to boot from different boot sources. Particularly, it would be useful to be able to select which boot source to use and also to be able to configure new boot sources after the chip has been designed. This will allow the chip to be easily configured for a particular boot option without going through the expensive process of re-designing it.

According to embodiments of the present invention, the integrated circuit 1 comprises a writeable, non-volatile memory—preferably a permanent, one-time writeable memory—in this case in the form of a bank of fuse latches 5. These are fuses such as electronic fuses (E-fuses) which can be programmed by fusing selected fuses using an electric signal, or laser fuses which can be programmed by fusing selected fuses with a laser. The integrated circuit 2 also comprises a plurality of external pins including one or more boot configuration pins 9. In this example two boot configuration pins 9 are shown.

The IC 1 and device 2 also comprise a plurality of different boot sources. For example, the IC 1 may comprise a primary on-chip boot ROM 4a and a secondary on-chip boot-ROM 4b, which may be separate on-chip ROMs or different regions of the same on-chip ROM. The IC 1 may further comprise one or more external interfaces 6 to potential external sources of boot code, such as one or more external memory devices and/or one or more links to other devices external to the user device 10. In this example, the IC 1 comprises a first interface 6a to a first external flash memory 7a housed within the user device 10, a second interface 6b to a second external flash memory 7b housed within the user device 10, a third interface 6c to a first serial link 8a for connecting to another terminal other than user device 10 such as a separate computer, and a fourth interface 6b to a second serial link 8b. Each of the third and fourth interfaces 6c and 6d may for example be a UART (universal asynchronous receiver/transmitter).

The primary boot ROM 4a stores primary boot code from which the processor 2 is arranged to initially begin booting. When executed by the processor 2, the primary boot code uses the boot configuration pins 9 to determine the type and/or other details of a secondary boot source, as described below. This may be in addition to other basic boot functions of the primary boot code.

In the example shown, the bank of fuse latches 5 comprises a first set of fuse latches 5a, a second set of fuse latches 5b, a third set of fuse latches 5c, and a fourth set of fuse latches 5d. Each set 5a . . . 5d makes up a region of the bank which can be used to store parameters of a respective boot configuration, as discussed below.

The fusing of the latches 5 is preferably performed by the manufacturer at the end of the manufacturing process, with different batches of chips being fused with different boot configurations depending on the particular application or customer for which that batch is intended. But potentially, the chips could be manufactured with some of the fuses free for programming at a later stage, either by the manufacturer before their sale or by the customer after their sale.

So preferably, at least one set of boot parameters is pre-programmed into the bank 5 by the manufacturer of the IC 1. The parameters of each set preferably include a respective identifier of a source of secondary boot code. So for example each set 5a . . . 5d could include a respective eight-bit field whose value identifies a selection of one of the NAND flash 7a, NOR flash 7b, first UART 6c, second UART 6d, secondary ROM 4b and/or other sources (not shown).

Further, the sets 5 may comprise fields for other parameters to specify properties or options related to the identified source. For example, the latches of one set 5a could be used to specify not only 'UART' but that the UART is some speed X, with one or two stop bits, even parity, etc. Or some latches of another set 5b could be used to specify that the NAND flash is eight or sixteen bits wide. Or some latches could be used to indicate the input clock as being 15 MHz or 26 MHz, e.g. with a five-bit field being used to indicated PLL configuration etc.

The sets 5 may also comprise fields for other parameters to control pieces of application functionality—such as to specify a network operator or to specify whether the chip works with GSM as well as 3G.

Any unused fuse sets 5 are preferably locked. Alternatively, some or all of the sets of fuse latches 5 could potentially be left un-written after manufacture of the IC1, leaving it free for use instead by the maker of the user device 10. So for example two sets of fuse latches 5a and 5b could be pre-programmed with two respective sets of manufacturer defined boot configurations, and the other two sets 5c and 5d could be left free for the maker of the user device 10 to define two further respective boot configurations.

The maker of the user device 10 uses the boot configuration pins 9 to express a boot option. For example in the illustrated embodiment, four values expressed on the two boot-configuration pins 9 are mapped to respective sets 5a . . . 5d of the fuse latches as follows:

| Code at pins | Fuse latch set |
| --- | --- |
| 00 | 5a |
| 01 | 5b |
| 10 | 5c |
| 11 | 5d |

The boot configuration pins may be hardwired on the application board when making the device 10.

When the primary boot code from primary ROM 4a is executed, it uses the indication received on the boot configuration pins 9 to select the corresponding set of parameters for continuing the boot. This could be achieved by supplying the indication from the pins 9 to the processor 2 by a suitable interface and configuring the processor 2 to operate on the indication to retrieve the parameters from the fuse latches 5, either directly or via a DMA engine and/or system bus if the bank 5 is addressable. Alternatively, it could be achieved by providing dedicated logic between the pins 9 and the fuse bank 5 to map the indication to the required address from the bank 5, thus supplying the parameters to the processor 2 without the processor 2 needing to act directly on the indication at the pins 9.

The processor 2 then continues to boot from the secondary boot source identified in the selected set of registers, using the other parameters such as UART speed X, NAND width, external clock speed, etc. as appropriate in order to access that source.

Preferably the boot configuration pins 9 are in fact "re-used" debugging pins which are also used for connecting to a debugger. When the debugger is connected during development, it controls the boot itself. But when it's not connected, pull-up or pull-down resistors in the chip or on the board are used to apply the indication to the pins to configure the boot. This means that extra no pins will be needed, optimising the pin count.

As an alternative to the fuse latches 5, or in addition to them, one or more configurations could be hard-coded in the boot ROM. For example, three boot configuration pins 9 (eight values) could be used to select between four hardwired configurations and four fused ones.

An alternative form of identifier could be an address of the boot source. For example, an address in the secondary boot ROM 4b could be written into the first set of fuse latches 5a, an address in the address space of the first external interface 6a could be written into the second set of fuse latches 6b, an address in the address space of the second external interface 6b could be written into the third set of fuse latches 5c, and an address in the address space of the third external interface 6c could be written into the fourth set of fuse latches 5d. In that case, the secondary boot source options would be a region of the secondary on-chip ROM 4b, a region of the external flash memory 7a, a region of a second flash memory 7b, and the first serial link 8b (leaving the second serial link 8b unused as a source of secondary boot code). Alternatively, a set of fuse latches could be programmed with an address of the fourth interface 6d to make use of the second link, or with an address of a different external interface or on-chip memory (not shown). Or sets of latches 5 could be programmed with different addresses within the same external memory 7a or 7b so as to define two secondary boot sources within the same external memory device, or different addresses on the same serial link 8 to define two secondary boot sources accessed over the same link.

An embodiment is now described which is particularly advantageous in relation to wiring the configuration pins 9 of the chip 1 to the board. In this embodiment, instead of requiring external resistors to be wired to each of the boot configuration pins 9, an external resistor is needed only to specify a logic one on a configuration input pin 9 (by pulling it up to a high logical voltage). A logic zero in the boot-configuration is indicated by simply leaving the pin 9 unconnected on the board.

Figure 2:
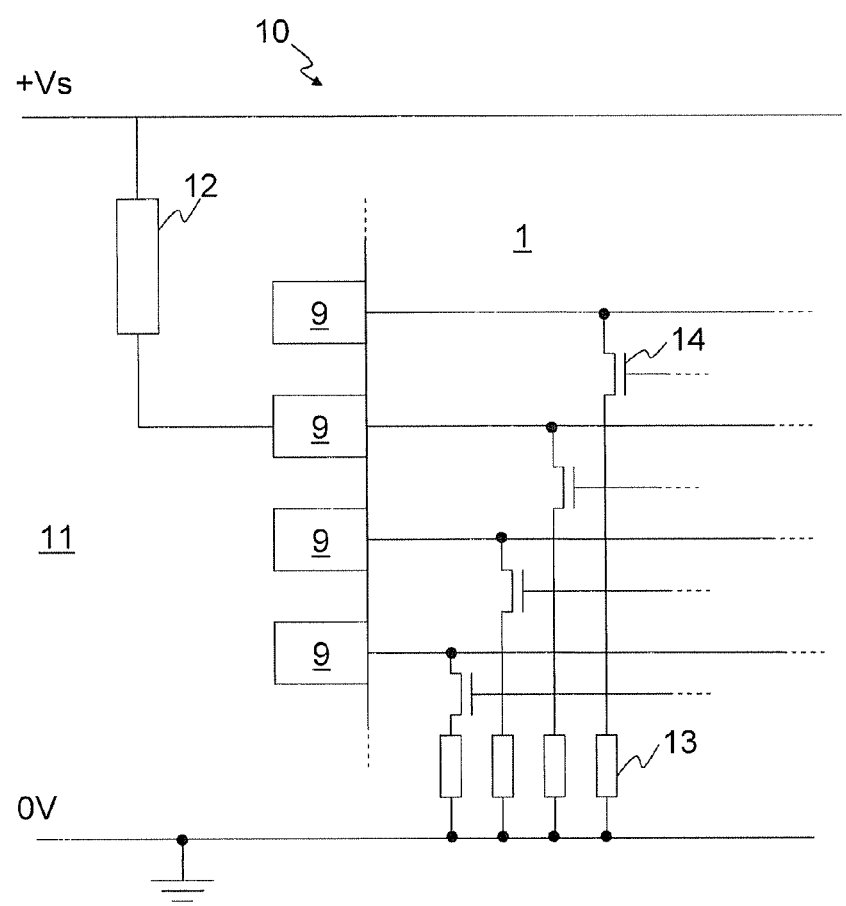
FIG. 2 illustrates a portion of the device 10 from FIG. 1 including part of the chip 1 being connected the board 11.

This is achieved by an arrangement such as shown in FIG. 2, which shows a portion of the device 10 including part of the chip 1 being connected the board 11. The device 10 has a positive supply rail (+Vs) and a ground rail (0V). At each of the boot configuration pins 9, internally the chip 1 comprises a switchable pull-down resistor arrangement. Each such arrangement comprises an internal pull-down resistor 13 and a transistor switch 14 connected in series between the respective pin 9 and the 0V rail. To select a boot configuration, a logic one is specified at a configuration pin 9 by tying that pin to the positive rail +Vs with a pull-up resistor 12, but a logic zero is specified by simply leaving a pin externally unconnected during the boot. In the illustrated example, one of four boot configuration pins 9 is set at logic one and the other three pins 9 are set to logic zero. In a preferred implementation, the internal pull down resistors 13 are about 50 kΩ.

The procedure for reading the value on a pin 9 at boot is then as follows:
i) turn on the internal switchable pull-down resistor arrangement 13, 14 for a period sufficient to pull the pin 9 down to logic zero, about thirty microseconds in the preferred implementation;
ii) turn off the internal switchable pull-down resistor arrangement 13, 14 and wait for a further period sufficient for the pin 9 to be pulled up to a logic one if the pin is connected to external pull-up resistor 12 but insufficient for the pin 9 to float to a logic high if not connected, again about thirty microseconds in the preferred implementation;
iii) read the value on the pin 9;
iv) if the value on the pin 9 is logic zero then re-activate the internal switchable pull-down resistor arrangement 13, 14, but if the value on the pin 9 is logic one then leave the internal pull-down resistor arrangement 13, 14 off.

With regard to step (ii), note that the pin must float low only for this time if there is no external pull-up resistor 12, otherwise the pin 9 might float high giving the wrong result. Of course, the actual safe period may vary for different circuits. The last step (iv) avoids leaving the pin 9 floating if there is no external pull-up resistor 12. Equally, if there is an external pull-up, then the internal pull-down resistor arrangement 13, 14 is left off so as not to create a static current path through the two resistors 12, 13.

As described below, this pin-wiring scheme has a number of valuable advantages.

Firstly, it minimises the number of external resistors needed on the board 11. Indeed, to select an all-zero configuration input, no resistors are needed at all. To take full advantage of this, the all-zero input could be mapped to the most likely or preferred boot configuration.

Secondly, after start-up no current is drawn through the resistors that are used. When no external pull-up resistor 12 is connected then there is simply no path connected from the positive rail +Vs, and when an external pull-up resistor is connected then the pull-down resistor 13 is disconnected by the transistor switch 14 so there is no path to ground. Therefore no static current is drawn, whatever the input, thus saving on power consumption.

Thirdly, there is no need to strongly drive the configuration inputs 9, which can thus be used for other purposes when not booting. This means fewer extra pins will be needed to exclusively to specify the boot configuration, reducing the pin count. Indeed in the all-zero configuration, no extra pins will be needed.

For example, in a preferred application this mechanism of re-using pins can be used for connecting the debugger mentioned above. When the debugger is connected during development, it controls the boot itself. But when it's not connected, the switchable pull-down resistors 13 in the chip and any required external pull-up resisters 12 are used to apply the indication to the pins in order to configure the boot.

It will be appreciated that the above embodiments are described only by way of example. In other embodiments, the invention may use other types of boot sources, other types of non-volatile memory to store the identifiers of the boot sources, other ways of identifying the sources, and other ways of mapping an indication input at the pins to the identifiers. Further, the invention may have applications other than to a soft modem. The problem of selecting boot parameters is relevant to many different applications of the chip. Further, instead of a processor in the sense of something for executing software, the mechanism could be used to configure the booting of a hardware engine. With regard to the pin-wiring scheme, alternatives include other possible uses of the boot configuration pins 9 after booting, and the use of external pull-down resistors in conjunction with internal switchable pull-up resistors. Other applications and configurations may be apparent to the person skilled in the art given the disclosure herein. The scope of the invention is not limited by the described embodiments, but only be the following claims.

The invention claimed is:

1. An integrated circuit comprising:
a processor;
a plurality of external pins operatively coupled to the processor;
a permanently written memory operatively coupled to the processor, the memory having a plurality of regions each storing one or more respective boot properties for booting said processor; and
a respective internal switch able resistor arrangement coupled between each of one or more of said pins and a first voltage rail, configured to couple its respective pin to the first voltage rail if that pin is not externally coupled to a second voltage rail during booting, and to de-couple its respective pin from the first rail if that pin is externally coupled to the second voltage rail during booting;
wherein the processor is programmed to select one of said regions in dependence on an indication received via one or more of said external pins, to retrieve the one or more respective boot properties from the selected region, and to boot using the one or more retrieved boot properties.

2. The integrated circuit of claim 1, wherein:
the one or more boot properties in each region comprise at least an identifier of a respective boot source; and
the processor is programmed to retrieve the respective identifier from the selected region, and to boot from the source of boot code identified by the retrieved identifier.

3. The integrated circuit of claim 2, wherein:
the integrated circuit comprises a primary boot ROM storing primary boot code, each of said sources being a source of secondary boot code; and
the processor is configured to initiate booting by executing the primary boot code, the primary boot code containing code which when executed causes the processor to retrieve the identifier and continuing the booting from the secondary boot code of said identified source.

4. The integrated circuit of claim 2, wherein said memory comprises at least one of: a bank of fuse latches and a ROM.

5. The integrated circuit of claim 2, wherein the identifier is an identifier of one of: an external flash memory, a serial link, and a secondary on-chip ROM.

6. A user device comprising the integrated circuit of claim 2 and a radio frequency (RF) front-end, wherein said one or more pins are connected to indicate a source for configuring the processor as a soft modem for communicating over a wireless cellular network via said RF front-end.

7. The integrated circuit of claim 1, wherein said one or more pins are debugging pins for connecting to a debugger, arranged to allow the debugger to control the boot when connected to those pins and said indication to control the boot when the debugger is not connected.

8. A method of booting an integrated circuit comprising a processor, the method comprising:
inputting an indication of a boot option to one or more external pins of the integrated circuit;
using said indication to identify one of a plurality of regions in a permanently written memory on the integrated circuit, each region storing one or more respective boot properties for booting the processor;
retrieving the one or more respective boot properties from the identified region of said memory;
booting the processor using the one or more retrieved boot properties; and
by using a respective internal switchable resistor arrangement coupled between each of said one or more pins and a first voltage rail, coupling each respective pin to the first voltage rail if that pin is not externally coupled to a second voltage rail during booting, and de-coupling the respective pin from the first rail if that pin is externally coupled to the second voltage rail during booting.

9. The method of claim 8, wherein:
the one or more boot properties in each region comprise at least an identifier of a respective boot source;
said retrieval of the boot properties comprises retrieving the respective identifier from the selected region; and
said booting using the one or more retrieved properties comprises booting the processor from the source of boot code identified by the retrieved identifier.

10. The method of claim 9, comprising:
initiating booting by executing primary boot code from a primary boot ROM of the processor, the execution of the primary boot code retrieving the identifier and continuing the booting from the secondary boot code of said identified source.

11. The method of claim 9, wherein:
said sources of boot code include at least one of: an external flash memory, a serial link, and a secondary on-chip ROM; and
the booting of the processor comprises booting using secondary boot code from the identified one of the external flash memory, serial link and secondary on-chip ROM.

12. The method of claim 9, wherein said inputting comprises connecting said one or more pins to indicate a source for configuring the processor as a soft modem for communicating over a wireless cellular network via a radio frequency (RF) front-end.

13. The method of claim 8, wherein said memory comprises at least one of:
a bank of fuse latches and a ROM.

14. The method of claim 8, comprising using a debugger to control said one or more pins during debugging and said indication to control the boot when not debugging.

15. A system comprising:
an integrated circuit comprising:
a processor,
a plurality of external pins operatively coupled to the processor, and
a writeable non-volatile memory operatively coupled to the processor, and
a respective internal switchable resistor arrangement coupled between each of one or more of said pins and a first voltage rail, configured to couple its respective pin to the first voltage rail if that pin is not externally coupled to a second voltage rail during booting, and to de-couple its respective pin from the first rail if that pin is externally coupled to the second voltage rail during booting;
the memory having a plurality of regions each for storing one or more respective boot properties for booting the processor;
a writing apparatus arranged to write one or more respective boot properties to at least one of said regions for use in booting the processor; and
a programming apparatus arranged to program the processor to select one of said regions in dependence on an indication received via one or more of said external pins, to retrieve the one or more respective properties from the selected region, and to boot using the one or more retrieved boot properties.

16. The system of claim 15, wherein:
the writing apparatus is arranged to write said one or more boot properties so as to comprise at least an identifier of a respective boot source; and
the programming apparatus is arranged to program the processor to retrieve the respective identifier from the selected region, and to boot the processor from the source of boot code identified by the retrieved identifier.

17. The system of claim 16, wherein:
the processor comprises a primary boot ROM, and
the programming apparatus is arranged to write primary boot code to the primary boot ROM, each of said sources being a source of secondary boot code, the primary boot code containing code which when executed causes the processor to retrieve the identifier and start the booting from the secondary boot code of said identified source.

18. The system of claim 16, wherein said sources of boot code include at least one of: an external flash memory, a serial link, and a secondary on-chip ROM.

19. The system of claim 15, wherein said non-volatile memory is a one-time writeable memory.

20. The system of claim 19, wherein the non-volatile memory comprises a bank of fuse latches.

21. The system of claim 20, wherein the fuse latches comprises at least one of: electronic fuses and laser fuses.

22. The system of claim 15, further comprising an area of ROM having one or more further regions each storing one or more further respective boot properties for booting the processor;
wherein the programming means is arranged to program the processor to select one of said further regions in dependence on an indication received via one or more of said external pins, to retrieve the one or more respective further properties from the selected region, and to boot the integrated circuit using the retrieved boot properties.

23. The system of claim 15, wherein said one or more pins are arranged to allow the debugger to control the boot when connected to those pins and said indication to control the boot when the debugger is not connected.

24. A method of configuring an integrated circuit for booting, the integrated circuit comprising a processor, a plurality of external pins, a writeable non-volatile memory having a plurality of regions each for storing one or more respective boot properties, and a respective internal switchable resistor arrangement coupled between each of one or more of said pins and a first voltage rail, and the method comprising:
writing one or more respective boot properties to at least one of said regions of said non-volatile memory for use in booting the integrated circuit;
programming the processor to select one of said regions in dependence on an indication received via one or more of said external pins, to retrieve the one or more respective properties from the selected region, and to boot using the one or more retrieved boot properties; and
configuring each said switchable resistor arrangement to couple each respective pin to the first voltage rail if that pin is not externally coupled to a second voltage rail during booting, and to de-couple the respective pin from the first rail if that pin is externally coupled to the second voltage rail during booting.

25. The method of claim 24, wherein:
said writing of the one or more boot properties comprises at least writing an identifier of a respective boot source; and
said programming comprises programming the processor to retrieve the respective identifier from the selected region and to boot from the source of boot code identified by the retrieved identifier.

26. The method of claim 25, wherein:
the integrated circuit comprises a primary boot ROM; and
said programming comprises writing primary boot code to the primary boot ROM, each of said sources being a source of secondary boot code, the primary boot code containing code which when executed causes the processor to retrieve the identifier and start the booting from the secondary boot code of said identified source.

27. The method of claim 25, wherein said writing of the identifier of a respective boot source comprises writing an identifier of one of: an external flash memory, a serial link, and a secondary on-chip ROM.

28. The method of claim 24, wherein said memory is a one-time writeable memory and said writing comprises permanently writing the boot properties.

29. The method of claim 28, wherein the non-volatile memory comprises a bank of fuse latches and said writing comprise fusing selected latches.

30. The method of claim 29, wherein the fuse latches comprises at least one of: electronic fuses and laser fuses.

31. The method of claim 24, wherein
the integrated circuit further comprises an area of ROM having one or more further regions each storing one or more further boot properties for booting the processor;
the programming of the processor comprises programming the processor to select one of said further regions in dependence on an indication received via one or more of said external pins, to retrieve the one or more respective further properties from the selected region, and to boot the integrated circuit using the retrieved boot properties.

32. The method of claim 24, comprising using a debugger to control said one or more pins during debugging and said indication to control the boot when not debugging.

33. An integrated circuit comprising:
a processor;
a plurality of external pins;

a permanently written memory operatively coupled to the processor, the memory having a plurality of regions each storing one or more respective boot properties for booting said processor;

circuitry operatively coupled to the processor, the memory and the pins, the circuitry being configured to select one of said regions in dependence on an indication received via one or more of said external pins, to retrieve the one or more respective boot properties from the selected region, and to boot the process or using the one or more retrieved boot properties; and a respective internal switch able resistor arrangement coupled between each of one or more of said pins and a first voltage rail, configured to couple its respective pin to the first voltage rail if that pin is not externally coupled to a second voltage rail during booting, and to de-couple its respective pin from the first rail if that pin is externally coupled to the second voltage rail during booting.

34. An integrated circuit comprising:

a plurality of external pins;

a permanently written memory operatively coupled to the processor, the memory having a plurality of regions each storing one or more respective boot properties for booting the integrated circuit;

circuitry operatively coupled to the pins, the circuitry being configured to select one of said regions in dependence on an indication received via one or more of said external pins, to retrieve the one or more respective boot properties from the selected region, and to boot the integrated circuit using the one or more retrieved boot properties; and a respective internal switch able resistor arrangement coupled between each of one or more of said pins and a first voltage rail, configured to couple its respective pin to the first voltage rail if that pin is not externally coupled to a second voltage rail during booting, and to de-couple its respective pin from the first rail if that pin is externally coupled to the second voltage rail during booting.

35. An integrated circuit comprising:

processing means;

external input means;

permanent storage means having a plurality of regions each storing one or more respective boot properties for booting the processing means;

selection means for selecting one of said regions in dependence on an indication received via said input means, retrieving the one or more respective boot properties from the selected region, and booting the processing means using the one or more retrieved boot properties; and a respective internal switch able resistor arrangement coupled between each of one or more of said input means and a first voltage rail, configured to couple its respective input means to the first voltage rail if that input means is not externally coupled to a second voltage rail during booting, and to de-couple its respective input means from the first rail if that input means is externally coupled to the second voltage rail during booting.

36. A user terminal having an integrated circuit comprising:

a processor;

a plurality of external pins operatively coupled to the processor;

a permanently written memory operatively coupled to the processor, the memory having a plurality of regions each storing one or more respective boot properties for booting said processor; and a respective internal switch able resistor arrangement coupled between each of one or more of said pins and a first voltage rail, configured to couple its respective pin to the first voltage rail if that pin is not externally coupled to a second voltage rail during booting, and to de-couple its respective pin from the first rail if that pin is externally coupled to the second voltage rail during booting wherein the processor is programmed to select one of said regions in dependence on an indication received via one or more of said external pins, to retrieve the one or more respective boot properties from the selected region, and to boot using the one or more retrieved boot properties.

* * * * *